(No Model.) 4 Sheets—Sheet 3.

G. H. SPAULDING.
CORN HARVESTER.

No. 426,475. Patented Apr. 29, 1890.

Witnesses.
B. M. Whitaker
Irvine Miller

Inventor
George H. Spaulding.
By Coburn & Thacher
Att'ys.

THE NORRIS PETERS CO., PHOTO-LITHO., WASHINGTON, D. C.

(No Model.) 4 Sheets—Sheet 4.
G. H. SPAULDING.
CORN HARVESTER.
No. 426,475. Patented Apr. 29, 1890.
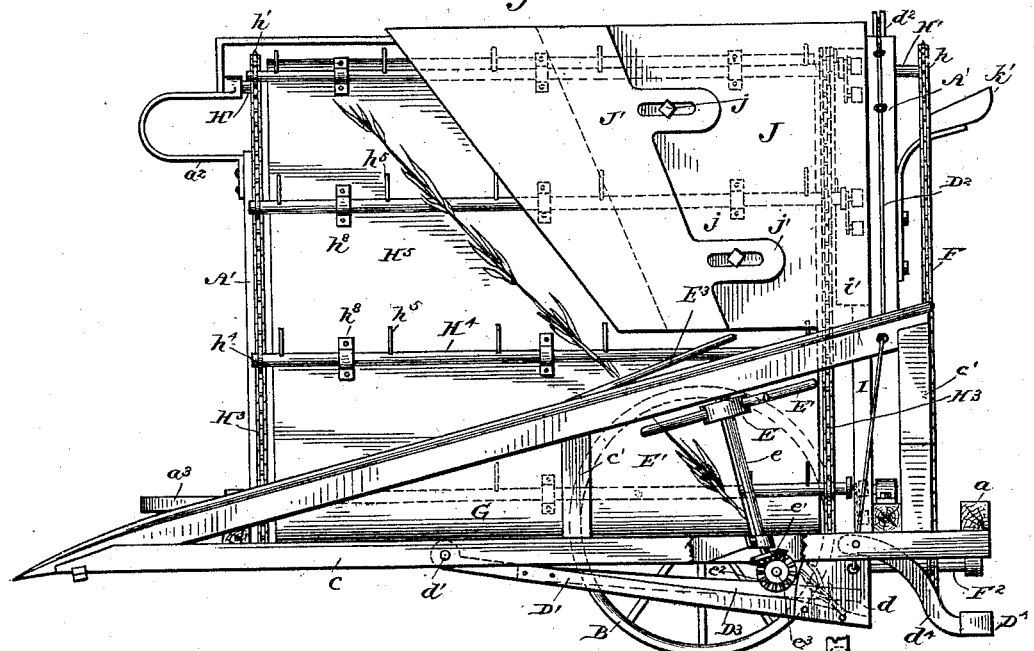
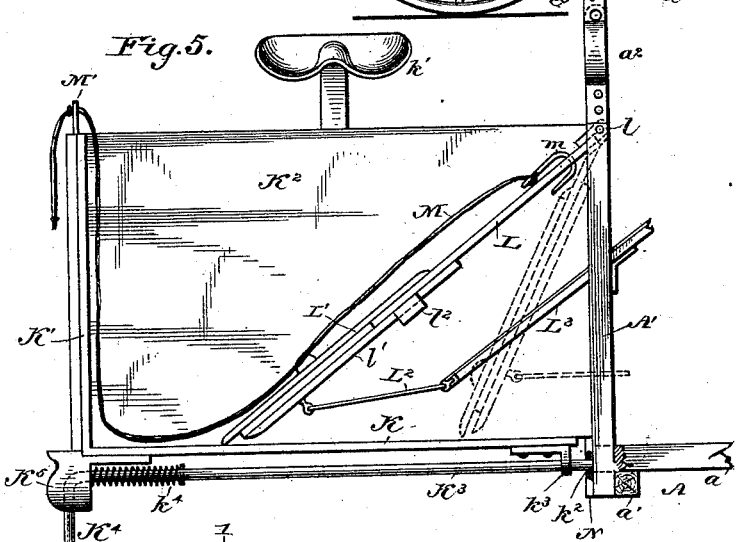
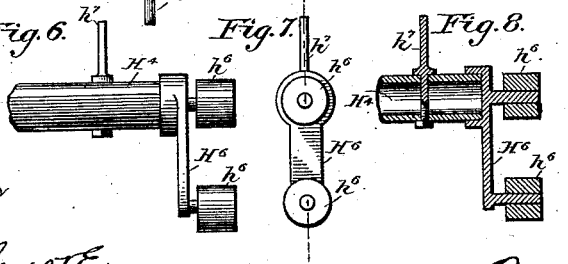
Witnesses
H. W. Elmore
H. L. Hillyer
Inventor
George H. Spaulding
Coburn & Thacher
Attorneys

UNITED STATES PATENT OFFICE.

GEORGE H. SPAULDING, OF CHICAGO, ILLINOIS, ASSIGNOR OF ONE-THIRD TO WILLIAM J. LUKENS, OF SAME PLACE.

CORN-HARVESTER.

SPECIFICATION forming part of Letters Patent No. 426,475, dated April 29, 1890.

Application filed October 20, 1888. Serial No. 288,720. (No model.)

*To all whom it may concern:*

Be it known that I, GEORGE H. SPAULDING, a citizen of the United States, residing at Chicago, in the county of Cook and State of Illinois, have invented a certain new and useful Improvement in Corn-Harvesters, which is fully set forth in the following specification, reference being had to the accompanying drawings, in which—

Figure 1:
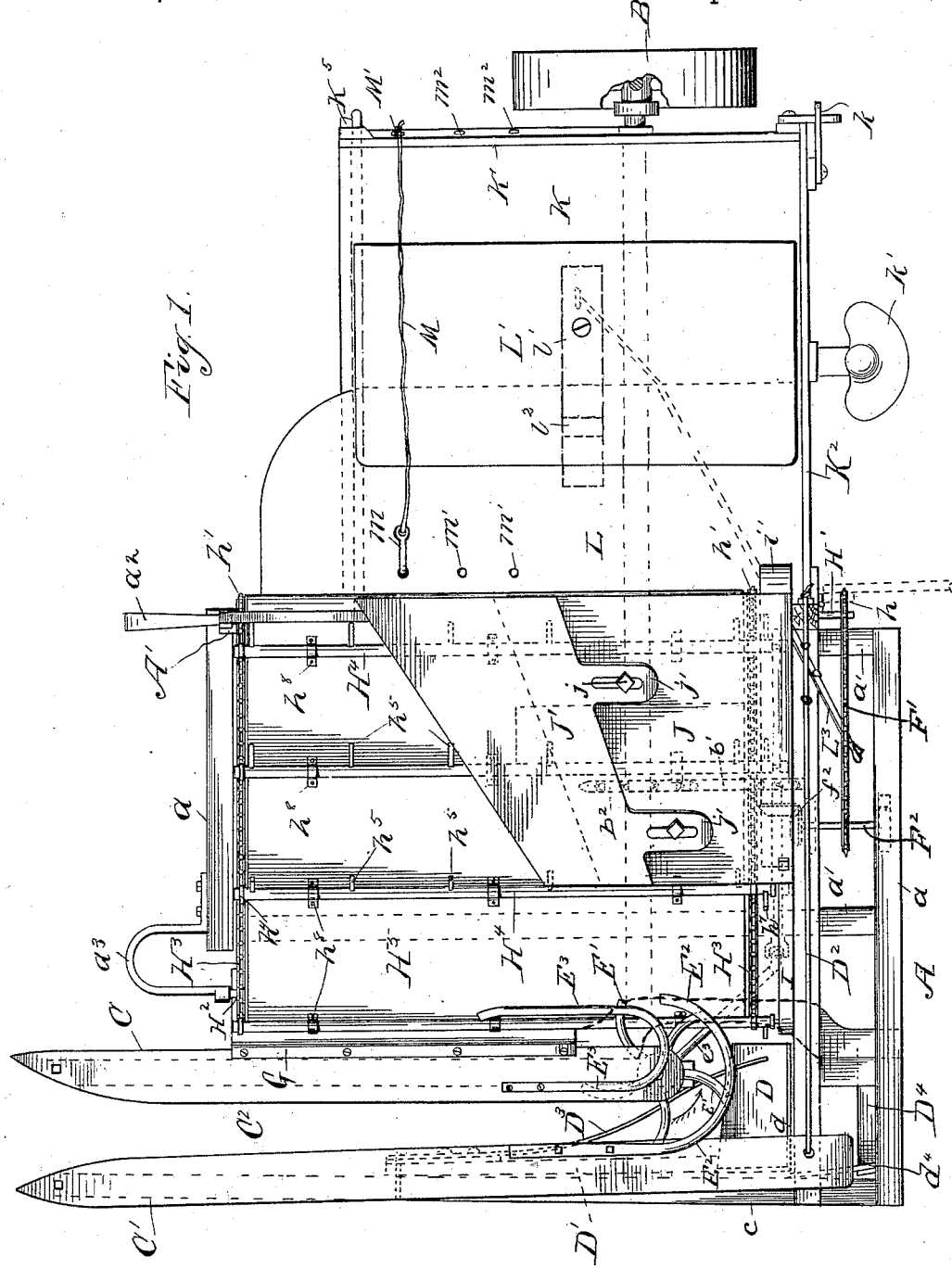
Figure 2:
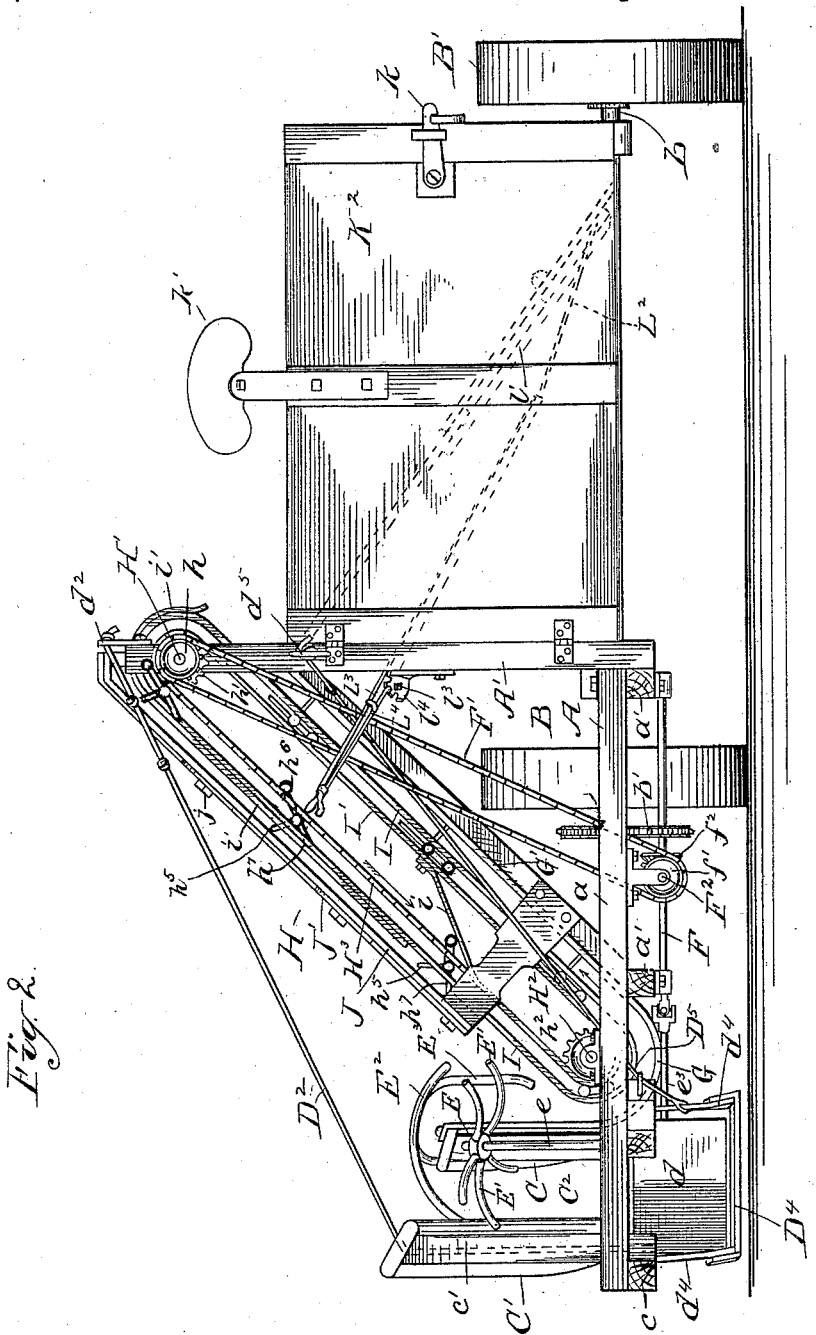
Figure 3:
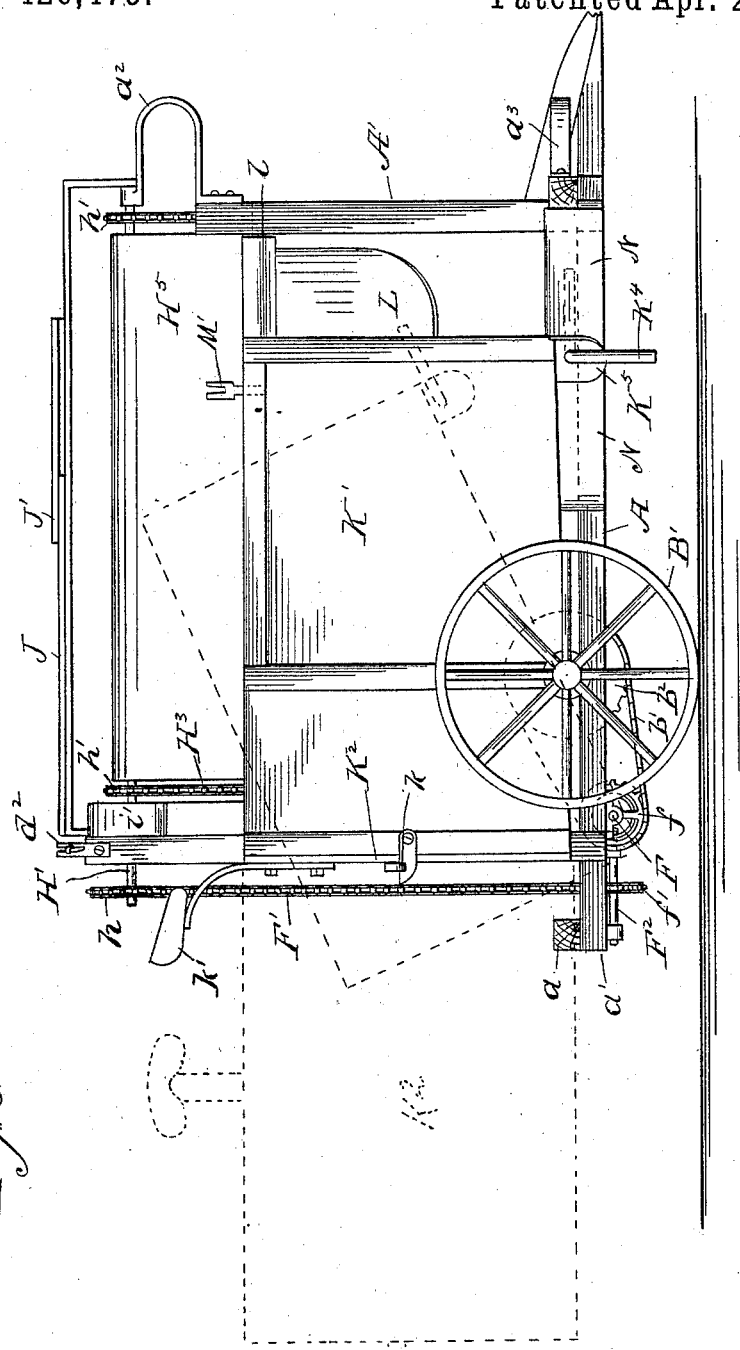

Figure 1 is a plan view of a corn-harvester embodying my invention; Fig. 2, a rear elevation of the same; Fig. 3, a side elevation; Fig. 4, a side elevation of the machine, viewed from the side opposite to that shown in Fig. 3; Fig. 5, a front elevation of the shocking-platform; Fig. 6, a detail view of a portion of the elevator; Fig. 7, an end view of the construction shown in Fig. 6, and Fig. 8 a sectional view taken on the line 1 1 of Fig. 7.

Like letters refer to like parts in all the figures of the drawings.

My invention relates to corn-harvesters, and has for its object to provide a machine of this description whereby the standing corn may be cut, formed into shocks or bundles, and delivered from the machine upon the ground in a rapid and effective manner.

To this end my invention consists in certain novel features, which I will now proceed to describe, and will then particularly point out in the claims.

In the drawings, A represents a horizontal frame upon which the machine is supported, consisting of transverse sills $a$ and longitudinal sills $a'$. The rear transverse sills are extended laterally somewhat beyond the main frame at one side thereof, and at the opposite side of the said main frame there are mounted at the front and rear uprights A'.

The machine is supported upon wheels B and B', mounted on an axle $b$, which is in turn mounted in suitable boxes or bearings on the frame A. The wheel B is located within the main frame A, as indicated in dotted lines in Fig. 1, and the axle $b$ extends a considerable distance beyond the said main frame on the side opposite the cutters, the wheel B' being mounted on its end, thus leaving a sufficient space between the main frame and the said wheel B' to accommodate the tilting platform or stalk-receptacle.

C and C' represent the lifting and guiding arms or dividers, by means of which the standing stalks are properly guided to the cutter. The inner one C is attached to the side of the main frame A, and the outer one C' is supported by a forward-extending beam $c$, the rear end of which is attached to the laterally-projecting ends of the rear transverse sills $a$. These guiding-arms extend upward and rearward, being inclined as shown, and are supported by suitable uprights $c'$. It will be observed that the outer guiding-arm and its beam $c$ are supported entirely from the rear, thus leaving between the guiding-arms a space $C^2$ to receive the stalks. The inner guiding-arm C terminates at a point slightly in advance of the cutter, while the outer guiding-arm C' is preferably continued some distance to the rear of the cutter, as shown.

D indicates the cutting-knife by which the standing stalks are severed, said knife consisting of a horizontal blade provided with a diagonal cutting-edge extending across the rear of the space $C^2$ between the guiding-arms, and also some distance inward beyond said space. This knife is provided with a hood or shield $d$, extending upward from the rear and outer sides of the knife a considerable distance, for the purposes hereinafter pointed out.

The cutter D is secured to the rear end of an arm D', which is pivoted at its forward end, as shown at $d'$, to the beam $c$, so that the said knife may be raised or lowered to cut the standing corn at different heights, as desired, this raising and lowering being preferably effected by a cord $D^2$, passing upward through the guiding-arm C', and led to a point within convenient reach of the driver, where it may be secured by means of a cleat $d^2$ or other suitable securing device.

$D^3$ indicates a spring secured at its forward end to the arm D', its free portion extending normally diagonally across the space in front of the cutter D, as shown in Fig. 1 of the drawings, and its rear end resting upon the top of said cutter or being arranged slightly above the same. This spring, being attached to the arm D′, must of course move along with said arm and cutter when the vertical position of these latter is changed.

D⁴ indicates a second knife or cutter arranged in the rear of the cutter D. This knife is supported by arms $d^4$, pivoted to the main frame A and to the beam c, respectively, at their forward ends, and its position may be adjusted by means of a suitable rope or cord $D^5$, led to a point within convenient reach of the driver and secured by means of a cleat or other suitable securing device $d^5$.

E indicates a reel mounted at the rear end of the inner guiding-arm C, and preferably beneath the same, as shown, said reel being secured upon a shaft e, which is inclined forward, as shown in the several figures of the drawings, at a suitable angle, for the purpose hereinafter described. This reel is provided with arms E′, which arms are curved or bent, their curvature being rearward from their inner to their outer ends with respect to the direction of motion of the reel, which direction is indicated by the arrow in Fig. 1 of the drawings.

$E^2$ indicates a guide-bar, attached to the outer guiding-arm C′ and bent in the arc of a circle, as shown in Fig. 1, describing about a semicircle around the rear end of the inner guiding-arm C, the radius of which is the center of the reel E.

$E^3$ represents a similar guide-bar, attached to the inner guiding-arm C and bent inward upon itself, as shown in Fig. 1, in about a semicircle, extending thence forward toward the front of the machine for a considerable distance. The reel-shaft e is provided at its lower end with a bevel-gear e′, with which meshes a corresponding bevel-gear $e^2$ on a diagonal shaft $e^3$, which is connected at its rear end by means of a suitable universal joint to a counter-shaft F. This counter-shaft is driven from the axle b by means of a sprocket-chain b′, which passes over a sprocket-wheel $b^2$ on the axle b and over a similar sprocket-wheel f on the counter-shaft F.

G indicates a concave trough or receptacle arranged inside of the inner guiding-arm C, and extending from the front of the machine to the rear of said guiding-arm, but not to the rear of the machine. That side of the concave which is adjacent to the arm C is extended upward vertically, and its upper edge is suitably secured to said arm. Its other edge, which is the inner edge, abuts against and is flush with an incline G′, which extends upward therefrom over the wheel B to a point above the stalk receptacle or platform.

H represents a suitable elevator arranged parallel to and above the incline G′.

H′ represents the upper shaft of the elevator, which has its rear bearings on the uprights A′, its front bearing being supported by a U-shaped bracket $a^2$, for the purpose hereinafter described. This shaft is driven by means of a sprocket-chain F′, which passes over a sprocket-wheel h on said shaft and over a similar sprocket-wheel f′ on a longitudinal shaft $F^2$, which is driven from the counter-shaft F by bevel-gears $f^2$.

$H^2$ represents the lower shaft of the elevator, which has its rear bearings on the main frame A, its front bearing being supported by a U-shaped bracket $a^3$. This shaft is arranged above the center of the concave G. The shaft H′ is provided with sprocket-wheels h′, and the shaft $H^2$ is provided with similar sprocket-wheels $h^2$, and over these sprocket-wheels pass sprocket-chains $H^3$, which actuate the elevator. Rods $H^4$, having preferably the form of hollow tubing, as shown in detail in Figs. 6, 7, and 8, extend from front to rear of the elevator, being mounted in suitable bearings $h^4$, attached to the sprocket-chains $H^3$, and being capable of rocking or turning in said bearings. These rods support by means of loose clips $h^8$ a canvas belt $H^5$, which forms the body of the elevator, and are provided with teeth or fingers $h^5$ to engage with and carry the stalks. At their rear ends the rods $H^4$ project beyond the sprocket-chain $H^3$ and are each provided with an arm $H^6$, which carries rollers $h^6$.

I and I′ represent guides between which the rollers $h^6$ travel. The outer guide I extends entirely around the elevator, while the inner guide I′, commencing at a point slightly below the center of the elevator, extends first downward, forming an incline i, and then continues downward and then upward parallel with the guide I to the top of the elevator. The upper portion of the guide I, from the top of the elevator downward to a point slightly beyond where the inclined plane i commences, is provided with a forward-projecting extension i′, (shown in dotted lines in Figs. 1 and 4 of the drawings,) and each rod $H^4$ is provided with a corresponding dog or finger $h^7$, which bears against this extension while passing under the same.

J indicates a guard or shield which extends over the upper portion of the elevator above the same from the rear toward the front. Its forward portion is adjustable, and consists of a separate piece J′, provided with slotted arms j′, through the slots of which pass bolts j, by means of which the said adjustable portion may be secured to the fixed portion of the guard or shield after adjustment. It will be observed that this guard or shield does not extend clear to the front of the elevator, but terminates at its upper portion at a point somewhat in the rear of the front of the elevator, its front end extending diagonally downward and rearward; nor does it extend from the top of the elevator to the bottom thereof, its lower edge being located a little more than half-way down the elevator.

K indicates a tilting platform or receptacle, which receives the stalks as they come from the elevator. It is mounted upon the axle b, so as to tilt thereon, and is open at its front end, its outer side being closed by means of a side piece or upright partition K', while its rear end is normally closed by means of a hinged door K². The door K² is hinged to the rear upright A' on the main frame A, and therefore does not partake of the tilting motion of the platform. When closed, the said door is held in position by means of a suitable latch $k$, and the driver's seat $k'$ is mounted upon the said door. The tilting platform or receptacle K is held in its normal or locked position by means of a locking-rod K³, which engages with a suitable recess $k^2$ in the main frame A. The locking-rod K³ is mounted in suitable bearings $k^3$ on the under side of the platform K at the front thereof, and is capable not only of a longitudinal motion in said bearings, but also of a rotary motion. It is forced normally inward toward the recess $k^2$ by means of a spring $k^4$, and is provided with a crank arm or handle K⁴ at its outer end, in the path of which is arranged a fixed cam K⁵, which, when the said crank-arm is turned upward and forward into the position shown in dotted lines in Fig. 3 of the drawings, withdraws the other end of said locking-rod from the recess $k^2$.

L represents an apron, which is suspended from a shaft $l$, mounted in the uprights A', and which when in a vertical position closes the inner side of the platform or receptacle K. This apron is provided at its lower end with an extensible section L', which is connected to the upper section by means of a tongue $l'$, passing through a suitable loop $l^2$ on the under side thereof.

L² represents a link connected to the under side of the extensible section L' at one end, its other end being connected to the forward end of a diagonal lever L³, which is pivoted at $l^3$ on the rear upright A'. A suitable locking-bolt L⁴ and notched arc $l^4$ are provided for securing the lever.

M represents a suitable cord or rope, one end of which is provided with a suitable hook $m$, which may be inserted in any one of a series of apertures $m'$ near the top of the apron L.

M' indicates a cleat or other similar fastening device, which may be inserted in any one of a series of apertures $m^2$ in the top of the side K', and which serve to receive the other end of the cord or rope M.

N represents a plate or board secured to the main frame A at that side thereof adjacent to the receptacle K, and extending rearward from the front upright A' some distance. This board or plate forms that portion of the main frame A in which the recess $k^2$, which receives the end of the locking-rod K³, is located.

The operation of the machine is as follows: The various parts thereof being in the positions shown in full lines in the drawings, as the machine advances, the standing stalks enter the space C² between the guiding-arms C and C'. The stalk first comes in contact with the spring D³, which it presses laterally outward, and is carried backward not only by the motion of the machine, but also by the reel E, which carries it between the guides E² and E³. It then comes in contact with the cutter D, the diagonal edge of which acts upon the standing stalks so as to sever the same with a diagonal or shearing cut. The said knife may be adjusted through the medium of the adjusting mechanism described for that purpose, so as to cut the standing stalks at a greater or less height, as desired, and this adjustment may be effected by the driver from his seat and while the machine is moving, and may be instantly varied at any time. The hood $d$ upon the cutter serves to prevent the butt-end of the severed stalk from leaving the knife either toward the outside or toward the rear. As soon as the stalk is cut, the spring D³ acts to force the butt-end of the same laterally inward toward the elevator. In the meanwhile, however, the reel E by its rotation has forced the upper portion of the stalk around through the space between the guides E² and E³, so that the stalk is inclined forward with its butt to the rear, as indicated at $x$ in Fig. 4. The stalk is finally dropped into the concave G, where it lies longitudinally with its top toward the front and its butt toward the rear. This action is facilitated by the downwardly-moving upper portion of the elevator H. It will be observed that the rear upper portion of said elevator is protected by the guard or shield J, the object being to prevent the upper end of the stalk from catching under the rods H⁴ of the elevator or their fingers, and thus bending or breaking the same. This object is further assisted by the fact that the fingers $h^7$ on the rods H⁴ bear against the forward extension $i'$ of the upper guide I during the upper portion of their course, and thus hold the teeth or fingers $h^5$ in a position which is inclined upward or backward with relation to the direction of motion of the elevator, so that these fingers will not catch the stalks. The rollers $h^6$ on the arms H⁶ then come in contact with the incline $i$, after the fingers $h^7$ have passed clear of the extension $i'$, and so turn the rods H⁴ as to cause the teeth $h^5$ to project firmly outward in position to engage with the stalks. The stalk is then carried positively downward by these fingers into the concave G, and thence upward along the incline G' to the top thereof, where it is discharged into the stalk-receptacle K. During this portion of the course the fingers are held firmly in an outwardly-projecting position by means of the rollers $h^6$, which are held firmly between the guides I and I', as shown in the drawings. The ∪-shaped brackets $a^2$ and $a^3$ serve to permit the passage of the tops of any stalks which may project forward beyond the elevator. The guard or shield J may be adjusted so as to extend to a greater or less extent over the elevator, according to the requirements of the case, by adjusting the piece J' thereof through the medium of the means described for that purpose. It will be noted that the reel E is inclined forward and downward, so that it operates not only to carry the stalks around to the elevator, but also to force their forward ends downward during this operation, and the rearward curvature of the arms E' of said reel serves to prevent them from catching upon the stalks and bending and breaking them while operating upon them. The knife D⁴, arranged in the rear of and below the cutter D, serves to cut the standing stumps off close to the ground, and its position may be adjusted as desired while the machine is in motion. As the stalks are discharged from the elevator H, they fall upon the apron L, and are guided by the same to the outer side of the platform or receptacle K. As the number of stalks increase, the apron L may be withdrawn toward the elevator through the medium of the lever L³ and link L², and during this withdrawal the lower extension L' slides upward upon the upper portion, thus decreasing the total length of the apron as it is gradually drawn inward, and allowing the lower edge thereof to always rest upon the bottom of the receptacle K. The stalks are thus evenly distributed over said bottom, instead of being allowed to accumulate at the side thereof immediately adjacent to the elevator. The stalks of course rest above the cord or rope M, which passes underneath them. When a sufficient quantity of stalks to form the shock or bundle has accumulated, the motion of the machine is arrested and the driver descends from his seat, and, freeing the two ends of the cord or rope M, connects them with each other by taking a few turns of the loose end around the hook $m$, thus binding the shock temporarily. The door K² is then swung open by unfastening the latch $k$, and the handle K⁴ of the locking-rod K³ is turned upward into the position shown in dotted lines in Fig. 3 of the drawings, thereby releasing the locking-rod from the recess $k^2$. The platform or receptacle K is then tilted upon the axle $b$ in the manner shown in Fig. 3 of the drawings, and the shock is dumped upon the ground to the rear, and rests thereon in an upright position with the butts of the stalks downward. The temporary binding-rope M is then removed and another binding substituted therefor. The various portions of the machine are then returned to their original position and the operation proceeds as before. It will be observed that by reversing the position of the stalks after cutting so that they lie with their butts toward the rear, I am enabled to dump the shock toward the rear of the machine into a position where it will not interfere with the advance thereof.

It is obvious that various modifications in the details of construction and arrangement of the parts may be made without departing from the principle of my invention, and I therefore do not wish to be understood as limiting myself strictly to the precise details hereinbefore described, and shown in the drawings.

Having thus described my invention, what I claim as new, and desire to secure by Letters Patent, is—

1. In a corn-harvester, the combination, with suitable guiding-arms and the cutter arranged at the rear of the same, of guide-rods at the rear of the space between the guiding-arms, one on each side thereof, each bent laterally inward and then forward, and a reel extending into the space between said guide-rods, whereby the tops of the stalks are carried forward and the stalks are deposited with their butts toward the rear after cutting, substantially as and for the purposes specified.

2. In a corn-harvester, the combination, with suitable guiding-arms and the cutter arranged at the rear thereof, of guide-rods at the rear of the space between the guiding-arms, one on each side thereof, and each bent laterally inward and then forward, and a forwardly-inclined reel extending into the space between said guide-rods to incline the tops of the stalks forward after cutting and deposit the stalks with their butts toward the rear, substantially as and for the purposes specified.

3. In a corn-harvester, the combination, with suitable guiding-arms, a cutter arranged at the rear thereof, and guide-rods arranged at the rear of the space between the guiding-arms, one on each side thereof, and each bent laterally inward and then forward, of a reel extending into the space between said guide-rods to incline the stalks forward after cutting, an inclined elevator to receive the stalks, and a dumping receptacle or platform arranged at the delivery side of said elevator, substantially as and for the purposes specified.

4. In a corn-harvester, the combination, with the guiding-arms and the cutter arranged at the rear thereof, of guide-rods at the rear of the space between the guiding-arms, one on each side thereof, and each bent laterally inward and then forward, a reel extending into the space between said guide-rods and co-operating therewith to incline the stalks forward after cutting, an incline arranged adjacent to said reel, an elevator arranged above the incline and adapted to carry the stalk up the same, and a receptacle or platform arranged at the delivery side of the elevator and adapted to be tilted upward to discharge the stalks rearward, substantially as and for the purposes specified.

5. In a corn-harvester, the combination, with the guiding-arms, of an arm pivoted at its forward end under one of said guiding-arms, extending downward and rearward therefrom and free to yield upward, a knife-shaped cutter attached to the rear end of said pivoted arm to sever the standing stalks, and a rope or cord connected thereto and provided with means for fastening the same, substantially as and for the purposes specified.

6. In a corn-harvester, the combination, with the rigid guiding-arms and the cutter arranged at the rear thereof, of a spring having its fixed forward end located at the grainward guiding-arm, and extending therefrom rearward diagonally across the space between the arms to the cutter, substantially as and for the purposes specified.

7. In a corn-harvester, the combination, with the pivoted arm D' and the cutter D attached thereto, of the spring D³, attached to and moving with said arm, substantially as and for the purposes specified.

8. In a corn-harvester, the combination, with the cutter D, of the secondary knife D⁴, the pivoted arms d⁴, supporting said secondary knife, a cord D⁵, for raising and lowering the same, and means for fastening the cord to hold the cutter in various positions, substantially as and for the purposes specified.

9. In a corn-harvester, the combination, with the cutter, the concave adjacent thereto, and the reel, of the incline G', the elevator H, and its transverse rods H⁴, capable of rocking, provided with fingers h⁵, and having fingers h⁷ and arms H⁶, and the guides I and I', the latter having incline i and the former forward projection i', substantially as and for the purposes specified.

10. In a corn-harvester, the combination, with forwardly-extending guiding-arms having a stalk-passage between them, the elevator located at the side of said stalk-passage, the cutter, and reel at the rear end thereof, the upper portion of said elevator moving downward, of a shield covering the rear upper portion only of said elevator, substantially as described.

11. In a corn-harvester, the combination, with the elevator H, the upper portion of which moves downward, of the shield J, having adjustable extension J', substantially as and for the purposes specified.

12. In a corn-harvester, the combination, with the elevator H, the upper portion of which moves downward, of the reel E, arranged near the rear of said elevator in a forwardly-inclined position, and having rearwardly-curved arms E', substantially as and for the purposes specified.

13. In a corn-harvester, the combination, with the main frame, of the horizontally-pivoted receptacle and the end-gate of said receptacle hinged to the main frame, substantially as and for the purposes specified.

14. In a corn-harvester, the combination, with the main frame, of the stalk receptacle or platform and its end-gate, the latter hinged to the main frame, and the driver's seat attached to said end-gate and swinging with the same, substantially as and for the purposes specified.

15. In a corn-harvester, the combination, with the elevator and the stalk receptacle or platform, of the extensible apron hinged under the elevator and adapted to be extended across said receptacle or platform to distribute the stalks thereon, substantially as and for the purposes specified.

16. In a corn-harvester, the combination, with the receptacle K, of the apron L, hinged to one side thereof, extensible across the same, and having sliding extension L', and the lever L³, having link L² connected to said extension, substantially as and for the purposes specified.

17. In a corn-harvester, the combination, with the guiding-arms and the cutter located at the rear of the same, of the guide-rods extending first stubbleward and then forward from each guiding-arm, a reel extending into the space between said guide-rods, a concave to receive the severed stalks from the reel with their butts to the rear, an incline extending upward from said concave, and an elevator provided with a frame having guides and transverse rods having arms to engage said guides, and fingers to engage the stalks, whereby said fingers are withdrawn at the delivery end of the elevator and projected as they enter the concave, substantially as described.

GEORGE H. SPAULDING.

Witnesses:
 CARRIE FEIGEL,
 IRVINE MILLER.